United States Patent
Fujita

(10) Patent No.: US 11,650,778 B2
(45) Date of Patent: May 16, 2023

(54) CONTROL METHOD, INFORMATION PROCESSING APPARATUS, AND PRINT SYSTEM

(71) Applicant: CANON KABUSHIKI KAISHA, Tokyo (JP)

(72) Inventor: Tadanobu Fujita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/571,689

(22) Filed: Jan. 10, 2022

(65) Prior Publication Data

US 2022/0129225 A1    Apr. 28, 2022

Related U.S. Application Data

(63) Continuation of application No. 16/929,461, filed on Jul. 15, 2020, now Pat. No. 11,249,709.

(30) Foreign Application Priority Data

Jul. 26, 2019  (JP) .............. JP2019-137852

(51) Int. Cl.
  *G06F 3/12*   (2006.01)
  *H04N 1/00*   (2006.01)
  *H04N 1/393*  (2006.01)
  *H04N 1/387*  (2006.01)

(52) U.S. Cl.
  CPC ......... *G06F 3/1296* (2013.01); *H04N 1/0044* (2013.01); *H04N 1/00411* (2013.01); *H04N 1/3877* (2013.01); *H04N 1/393* (2013.01)

(58) Field of Classification Search
  CPC .... G06F 3/1296; H04N 1/0044; H04N 1/393; H04N 1/3877; H04N 1/00411; H04N 1/3875
  See application file for complete search history.

(56) References Cited

U.S. PATENT DOCUMENTS

| | | | |
|---|---|---|---|
| 6,765,691 B2 * | 7/2004 | Kubo | H04N 1/6011 |
| | | | 358/1.9 |
| 8,826,126 B1 | 9/2014 | Toscano et al. | |
| 2018/0107146 A1 | 4/2018 | Shinohara et al. | |
| 2019/0005364 A1 | 1/2019 | Omagari et al. | |

FOREIGN PATENT DOCUMENTS

JP    2006-060612 A    3/2006

\* cited by examiner

*Primary Examiner* — King Y Poon
*Assistant Examiner* — Michael L Burleson
(74) *Attorney, Agent, or Firm* — Venable LLP

(57) ABSTRACT

A method of controlling an information processing apparatus includes displaying an edit screen including an obtained image and a print range frame based on obtained print setting information, accepting an edit operation of arrangement of the image in the edit screen, generating image data based on an edited image, and transmitting the generated image data and the print setting information to the image forming apparatus as a print job. Where the image has been edited such that there is a region where the image is not arranged in the print range frame, combining processing in which a predetermined image is added in the region is performed and whereby image data including the image and predetermined image is generated, and where the image has been edited such that there is no region where the image is not arranged in the print range frame, the combining processing is not performed.

20 Claims, 12 Drawing Sheets

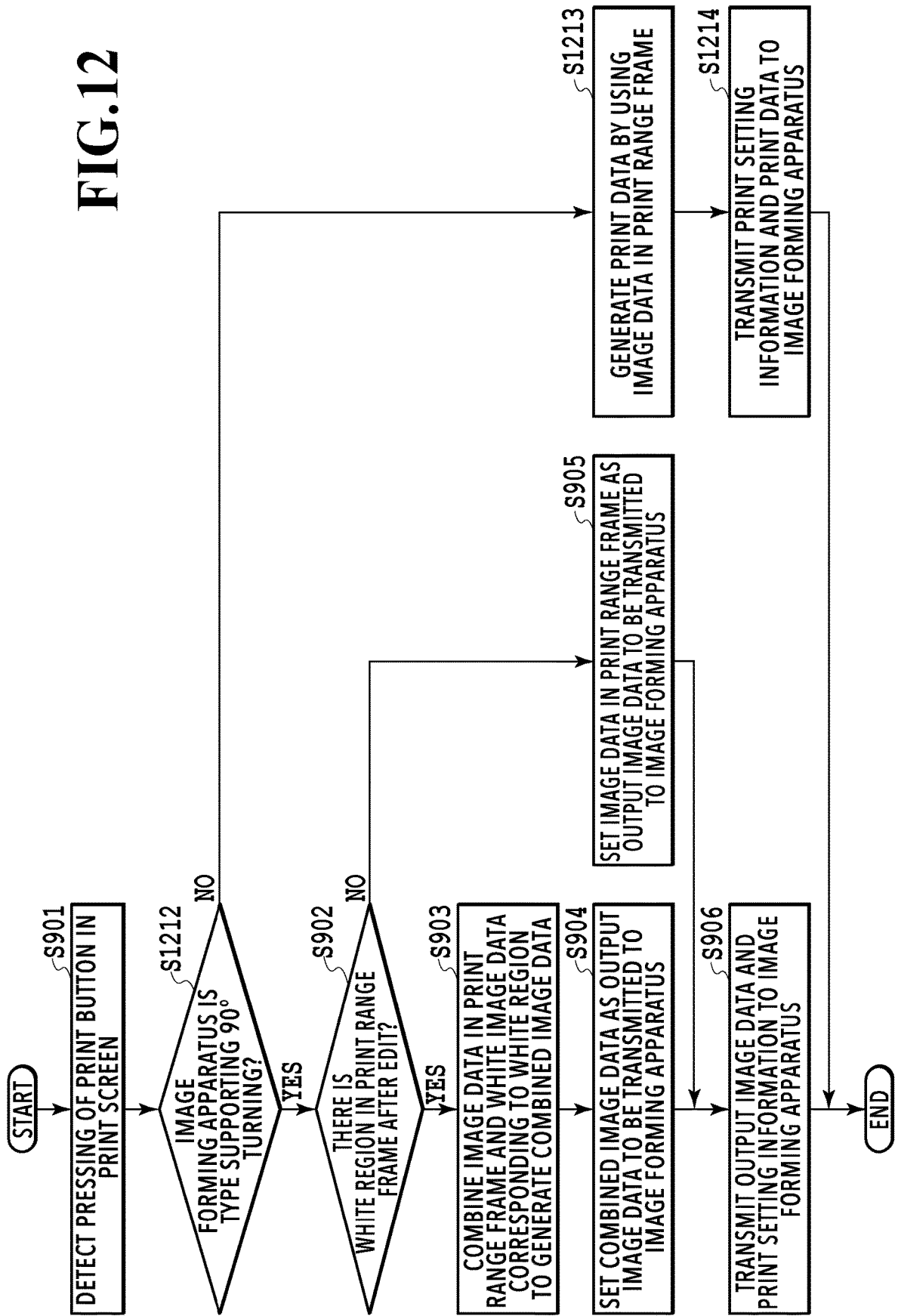

CONTROL METHOD, INFORMATION PROCESSING APPARATUS, AND PRINT SYSTEM

This application is a continuation of application Ser. No. 16/929,461, filed Jul. 15, 2020.

BACKGROUND OF THE INVENTION

Field of the Invention

The present disclosure relates to a control method, an information processing apparatus, and a print system.

Description of the Related Art

A print system in which an image forming apparatus performs printing based on image data transmitted from an information processing apparatus is known. Among image forming apparatuses, there is an apparatus that turns the image data 90 degrees based on a conveyance direction of a sheet in the image forming apparatus and an aspect ratio of the received image data and prints the image data.

Japanese Patent Laid-Open No. 2006-060612 describes the following technique. An information terminal determines whether to turn the image data 90 degrees based on the conveyance direction of the sheet and the aspect ratio of the image data. In the case where the turning is to be performed, the information terminal generates print data in which the image data is turned 90 degrees, and transmits the generated print data to a printer apparatus.

SUMMARY OF THE INVENTION

In some cases, a user freely arranges an image in a print range frame by enlarging or reducing the image data or by performing similar operations on the image processing apparatus and instructs printing. In such a case, in the image forming apparatus that turns the image data based on the conveyance direction of the sheet and the aspect ratio of the image data and prints the image data, there is a possibility that a print result not intended by the user is obtained.

A control method according to one aspect of the present disclosure is a method of controlling an information processing apparatus configured to transmit a print job to an image forming apparatus, the control method comprising the steps of: obtaining an image to be edited; obtaining print setting information used to print the image; displaying an edit screen including the image and a print range frame based on the print setting information; accepting an edit operation of arrangement of the image in the edit screen; generating image data in which a predetermined image is combined in a region where the image is not arranged in the print range frame, in response to input of a print instruction of the image after the edit operation; and transmitting the generated image data and the print setting information to the image forming apparatus as the print job.

Further features of the present invention will become apparent from the following description of exemplary embodiments with reference to the attached drawings.

BRIEF DESCRIPTION OF THE DRAWINGS

FIG. 12 is a flowchart illustrating the print data transmission processing in the application.

DESCRIPTION OF THE EMBODIMENTS

Figure 1:
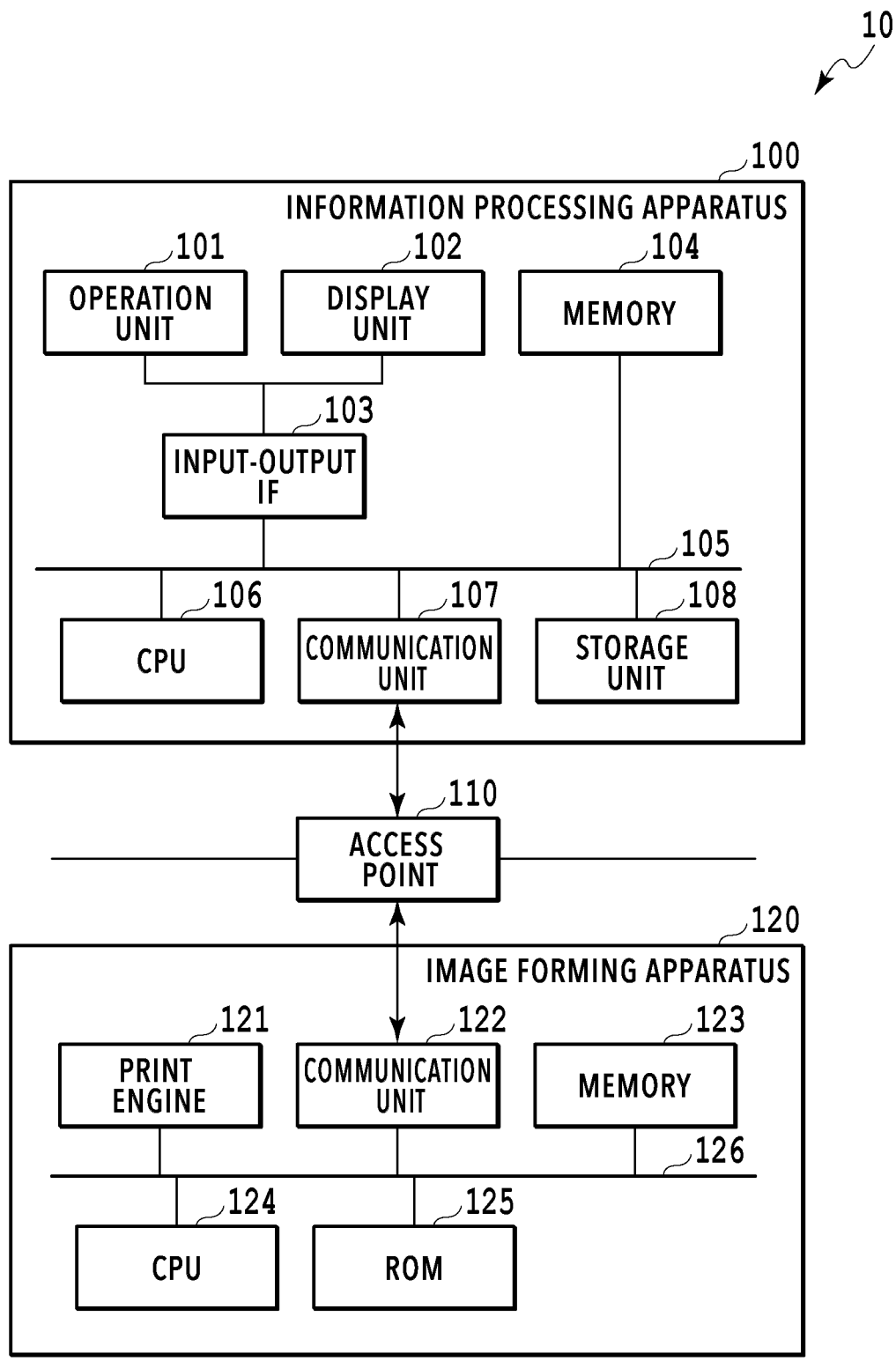
FIG. 1 is a diagram illustrating an example of a print system.

Embodiments of the present disclosure are described below with reference to the drawings. Note that the following embodiments do not limit the present disclosure and not all combinations of the characteristics described in the embodiments are necessary. Note that the same configurations are described by being denoted with the same reference numerals.

Embodiment 1

System Configuration

FIG. 1 is a diagram illustrating an example of a print system 10 used in the embodiment. The print system 10 includes an information processing apparatus 100, an access point 110, and an image forming apparatus 120. FIG. 1 also illustrates block diagrams of the information processing apparatus 100 and the image forming apparatus 120.

Configuration of Information Processing Apparatus

As illustrated in FIG. 1, the information processing apparatus 100 includes an operation unit 101, a display unit 102, an input-output IF (interface) 103, a memory 104, a CPU 106, a communication unit 107, and a storage unit 108 and these units are connected to one another via a bus 105.

The CPU 106 executes various programs such as applications stored in the storage unit 108. The memory 104 is used as a work memory, for example, in the case where the CPU 106 executes the programs. The operation unit 101 and the display unit 102 are connected to the input-output IF 103. The operation unit 101 is operated by a user and is configured of, for example, a keyboard, a mouse, buttons, a touch panel, or the like. The display unit 102 displays characters, images, or the like by being controlled by the CPU 106 and is configured of, for example, a liquid crystal monitor or the like.

The storage unit 108 stores an application that provides print execution functions, a print data generation program that generates print data interpretable by the image forming apparatus 120, and the like. Moreover, the storage unit 108 stores various programs such as an information exchange control program for exchanging information with the image forming apparatus 120 connected to the information processing apparatus 100 via the communication unit 107 and various types of information used by these programs.

The communication unit 107 is connected to an external apparatus such as the image forming apparatus 120 and executes data communication. The communication unit 107 can be connected to, for example, an access point (not illustrated) in the image forming apparatus 120. Connecting the communication unit 107 and the access point in the image forming apparatus 120 allows the information processing apparatus 100 and the image forming apparatus 120 to wirelessly communicate with each other. Note that the communication unit 107 may directly communicate with the image forming apparatus 120 through wireless communication or may communicate via an external access point (access point 110) present outside the information processing apparatus 100 and the image forming apparatus 120. A device such as a wireless LAN router can be given as an example of the access point 110. A communication method according to, for example, IEEE 802.11 series can be used as the wireless communication method. For example, communication methods according to IEEE 802.11a, IEEE 802.11n (Wi-Fi 4), IEEE 802.11ac (Wi-Fi 5), IEEE 802.11ax (Wi-Fi 6), and the like can be used. Moreover, communication such as Bluetooth (registered trademark) can be used.

Configuration of Image Forming Apparatus

The image forming apparatus 120 includes a print engine 121, a communication unit 122, a memory 123, a CPU 124, a ROM 125, and the like. These units are connected to one another via a system bus 126.

The print engine 121 forms (prints) an image on a printing medium such as paper by using printing agents such as inks based on a print job stored in the memory 123 or a print job received from the information processing apparatus 100 or the like and outputs a print result. The image forming apparatus 120 includes a not-illustrated printing head and forms an image by conveying a sheet that is the printing medium and forming an image with the printing head. Moreover, the print job includes image data such as JPEG, sheet size information, and the like.

The communication unit 122 has an access point to be connected to an external apparatus such as the information processing apparatus 100, as the access point in the image forming apparatus 120. The access point can be connected to the communication unit 107 of the information processing apparatus 100. Note that the communication unit 122 may directly communicate with the information processing apparatus 100 through, for example, wireless communication or may communicate with the information processing apparatus 100 via the access point 110. A communication method according to, for example, IEEE 802.11 series can be used as the wireless communication method. For example, communication methods according to IEEE 802.11a, IEEE 802.11n (Wi-Fi 4), IEEE 802.11ac (Wi-Fi 5), IEEE 802.11ax (Wi-Fi 6), and the like can be used. Moreover, communication such as Bluetooth (registered trademark) can be used.

The ROM 125 stores data such as control programs, a data table, and an OS program to be executed by the CPU 124. In the embodiment, the control programs stored in the ROM 125 performs software execution control such as scheduling, task switching, and interruption processing under control of an embedded OS stored in the ROM 125. The CPU 124 is a system control unit and controls the entire image forming apparatus 120 by executing programs or activating hardware.

The image forming apparatus 120 of the embodiment determines whether to turn an image of image data 90 degrees and print it or to print the image of the print data without turning it, based on a sheet conveyance direction and the image data, and executes print processing.

Figure 2A:
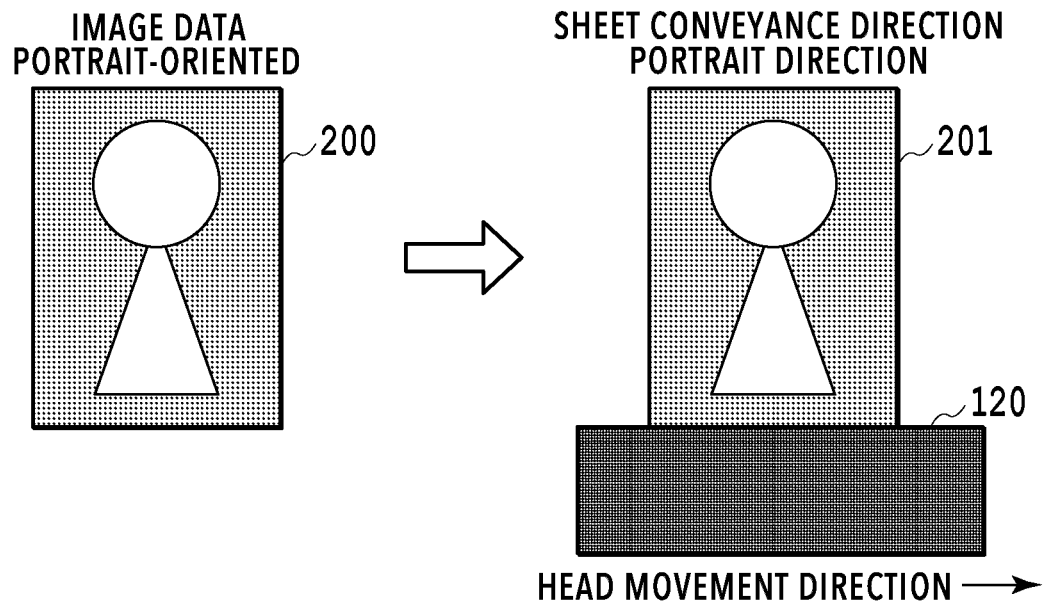
FIGS. 2A and 2B are views for explaining an example of turning an image and printing it in an image forming apparatus.
Figure 2B:
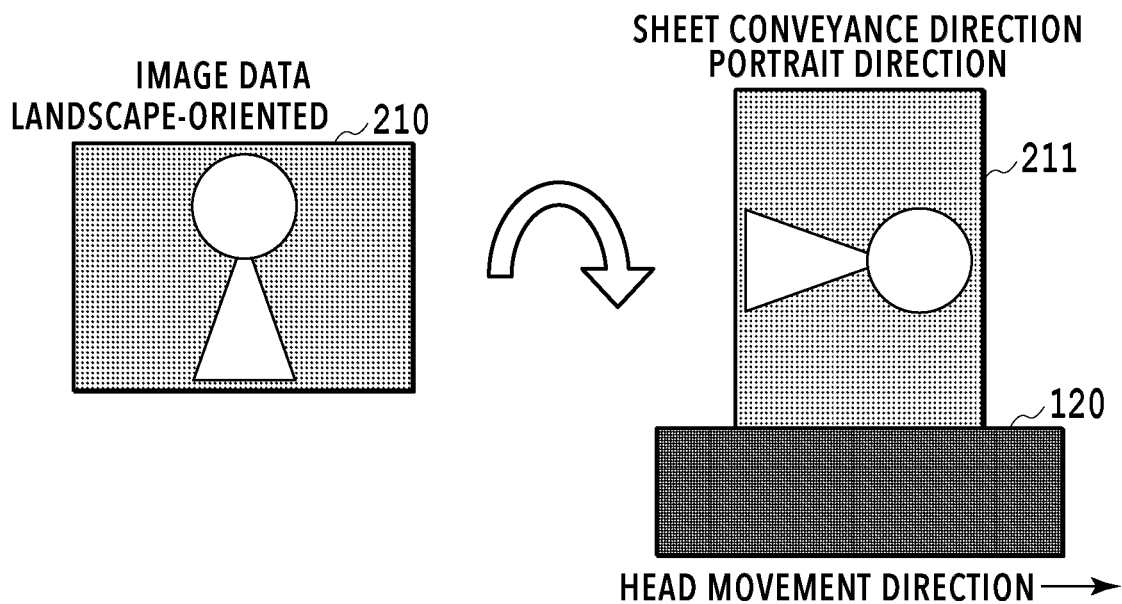

FIGS. 2A and 2B are views for explaining an example of processing of turning an image and printing it in the image forming apparatus 120 of the embodiment. The image forming apparatus 120 is configured to convey a sheet in a direction orthogonal to a moving direction of the printing head. Moreover, in the image forming apparatus 120, the conveyance direction of the sheet (referred to as sheet conveyance direction) is defined depending on the sheet size. For example, in the image forming apparatus 120 of the embodiment, the sheet conveyance direction is a portrait direction in the case where a sheet of A4 size is set. Specifically, the sheet of A4 size is set such that the short sides of the sheet correspond to the moving direction of the printing head and the long sides of the sheet correspond to the sheet conveyance direction. Accordingly, in the case where the sheet size is designated to be A4 size in print setting included in the print job, the image forming apparatus 120 determines that the sheet conveyance direction is the portrait direction, and performs the image forming processing. Moreover, as described later, in the case where a sheet of L (3R) size is set in the image forming apparatus 120, the image forming apparatus 120 determines that the sheet conveyance direction is the portrait direction.

The image forming apparatus 120 of the embodiment determines whether the image is a portrait-oriented image or a landscape-oriented image from size information (for example, aspect ratio) of the image in the image data included in the print job. Then, as illustrated in FIG. 2A, in the case where the image is a portrait-oriented image 200 and the sheet conveyance direction is the portrait direction, the image forming apparatus 120 prints the image 200 without turning it and a print result 201 is outputted. Meanwhile, as illustrated in FIG. 2B, in the case where the image in the image data included in the print job is a landscape-oriented image 210 and the sheet conveyance direction is the portrait direction, the image forming apparatus 120 turns the image 210 and prints it and a print result 211 is outputted. FIG. 2B illustrates an example in which the aspect ratio of the image 210 is, for example, 4:3 or 16:9. Since the sheet conveyance direction of the image forming apparatus 120 is the portrait direction, the image forming apparatus 120 turns the image such that the shorter sides ("3" in the case of 4:3, "9" in the case of 16:9) of the image 210 are arranged in the moving direction of the printing head. Note that, although the example in which the image is turned 90 degrees is described in this example, the image may be turned 270 degrees. Moreover, the image forming apparatus 120 prints the image data of the received job while enlarging or reducing (hereafter, referred to as scaling) it as necessary.

This type of image forming apparatus 120 automatically determines whether to turn an image and print it depending on the aspect ratio of the image, and performs the printing. Here, assume that an image is edited in the information processing apparatus 100 and the image forming apparatus 120 receives a print job including the edited image. In this case, the printing is sometimes performed with the image turned contrary to the intention of the user. In the embodiment, predetermined processing is performed in the information processing apparatus 100 to output a print result desired by the user in the image forming apparatus 120 capable of turning an image and printing it.

Figure 3:
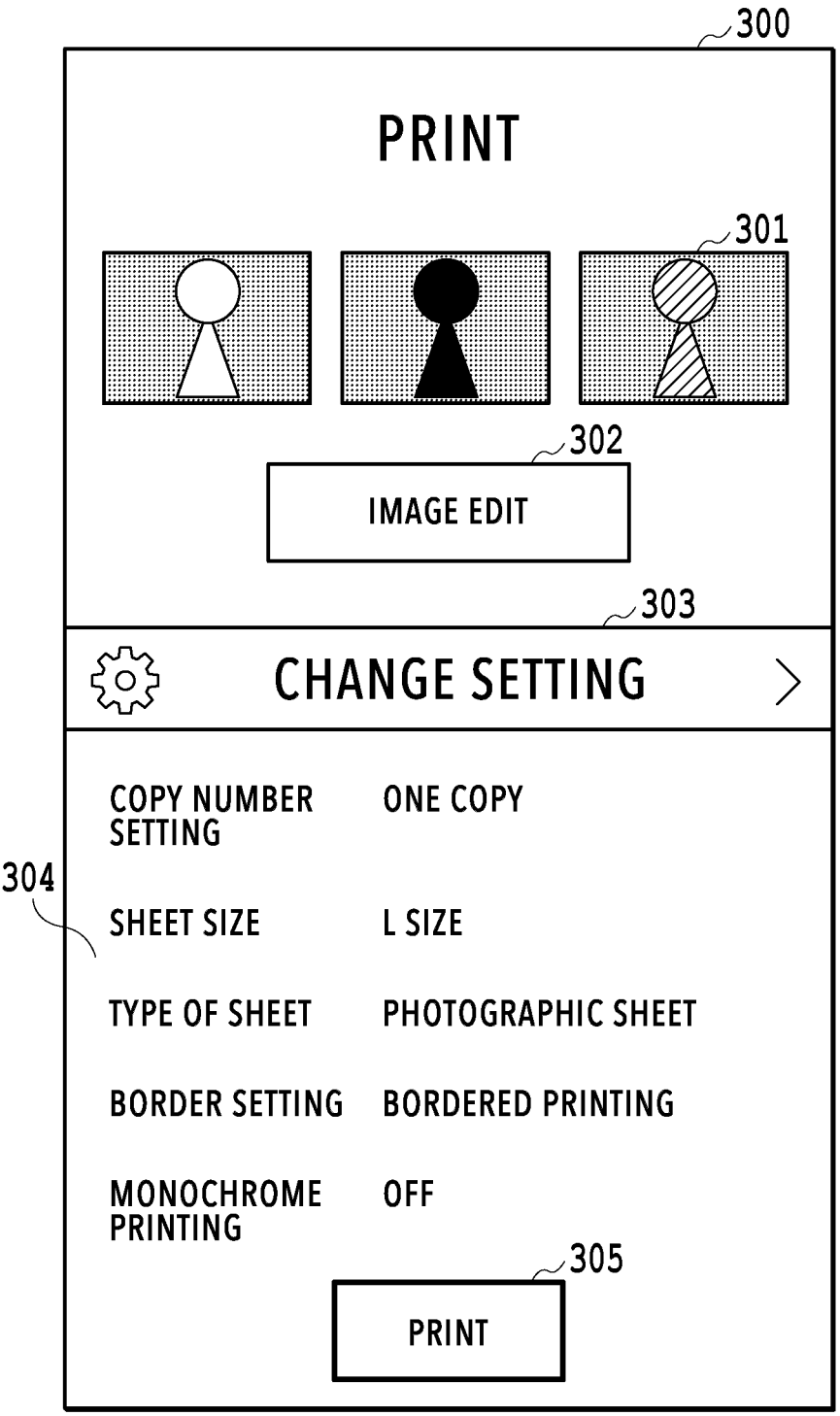
FIG. 3 is a view illustrating a print screen of an application.

FIG. 3 is a view illustrating a print screen 300 of an application operating on the information processing apparatus 100. In this example, it is assumed that the information processing apparatus 100 is a smartphone and the print screen 300 is displayed on a touch panel display in which the operation unit 101 and the display unit 102 are integrated. The print screen 300 includes an image list 301 capable of displaying multiple photographs and an image edit button 302 used to give an instruction of editing a photograph selected from the image list 301. Moreover, the print screen 300 includes a print setting change button 303 used to change the print setting, a print setting item list 304 for the sheet size and the like, and a print button 305 used to give an instruction to execute printing. The current setting of the print screen 300 illustrated in FIG. 3 is such that the copy number setting is one, the sheet size is L size, the type of sheet is photographic sheet, border setting is bordered printing, and monochrome printing is off. The border setting is used to determine a print effective region. For example, in the case where the border setting is bordered printing, the print effective region is determined in consideration of border portions (margin portions).

Figure 4:
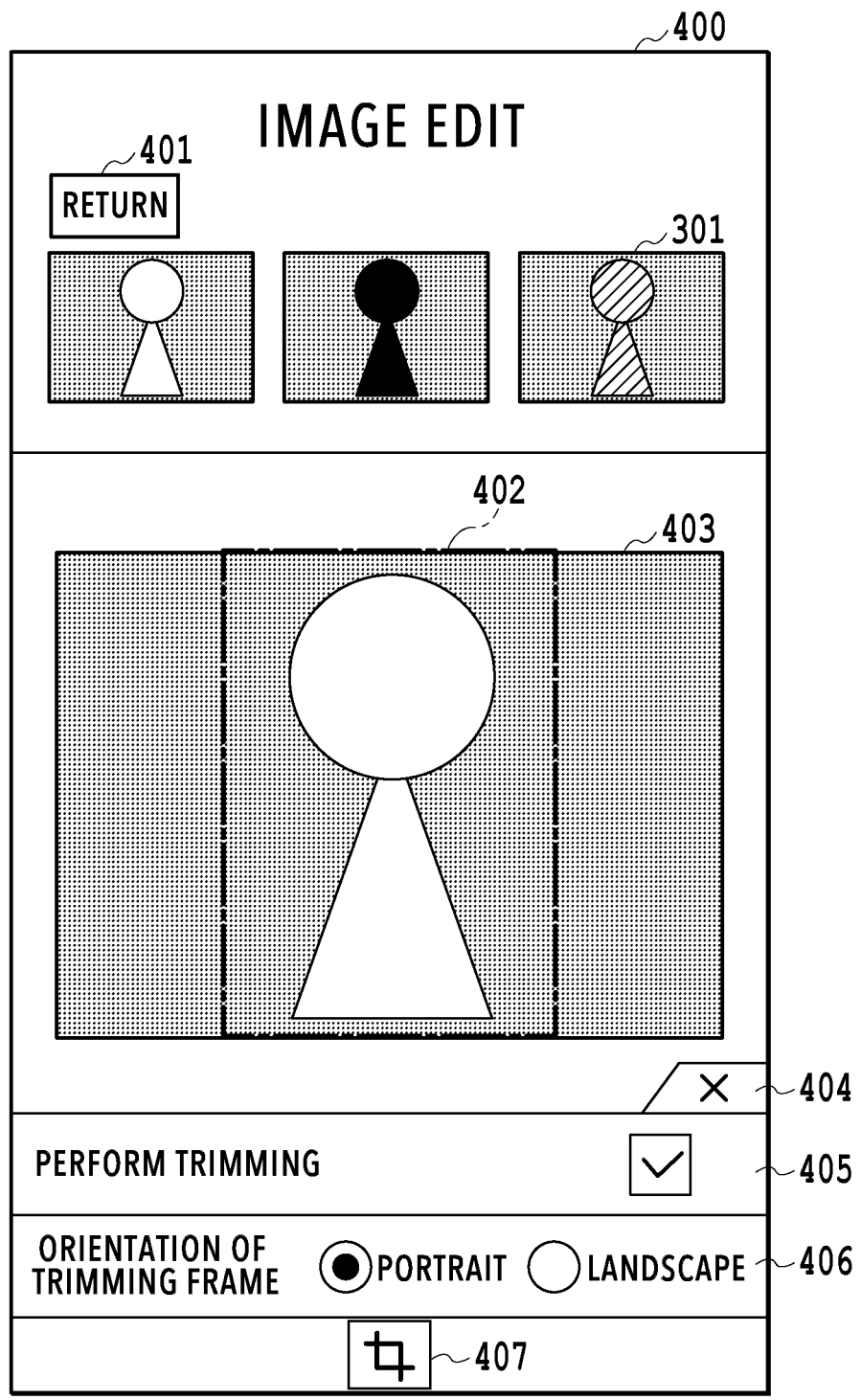
FIG. 4 is a view illustrating an image edit screen of the application.

FIG. 4 is a view illustrating an image edit screen 400 of the application operating on the information processing apparatus 100. In the case where the image edit button 302 is pressed in the print screen 300, the image edit screen 400 as illustrated in FIG. 4 is displayed. The image edit screen 400 includes the image list 301 and a return button 401 used to return to the print screen 300. Moreover, the image edit screen 400 includes a print range frame 402 used to trim an image 403 selected in the image list 301 and an open button 407 used to open a trimming setting area. The trimming setting area includes a check box 405 used to give an instruction of performing trimming, a radio button 406 used to set the orientation of the print range frame 420 (also referred to as trimming frame) to portrait or landscape, and a close button 404 used to close the trimming setting area.

The image edit screen 400 illustrated in FIG. 4 is in a state where the check box 405 is checked and the user has specified that trimming is to be performed. Moreover, the landscape-oriented image 403 is selected from the image list 301 as an image to be edited. Furthermore, the print range frame 402 is displayed to be superimposed on the image 403.

The print range frame 402 is described. In the example of FIG. 4, the check box 405 is checked and "portrait" is selected as the orientation of the trimming frame by using the radio button 406. Accordingly, the portrait-oriented print range frame 402 is displayed in the image edit screen 400 together with the image 403 that is the image to be printed. In this case, the print range frame 402 is displayed with the same aspect ratio as the aspect ratio of the print effective region. In this example, the sheet size of the print screen 300 is L size and the border setting is bordered printing. Accordingly, the print range frame 402 is displayed with the aspect ratio of the print effective region of the L size excluding the border portions. Note that, in the case where "landscape" is selected as the orientation of the trimming frame in the radio button 406, a landscape-oriented print range frame is displayed unlike in the example of FIG. 4. In the case where the image forming apparatus 120 of the embodiment receives the image data such as JPEG for printing, the image forming apparatus 120 performs printing while scaling the image therein. Accordingly, the print range frame 402 illustrates the print effective region and also illustrates the frame of the range (print range) in which the image is to be formed by the image forming apparatus 120.

Figure 5A:
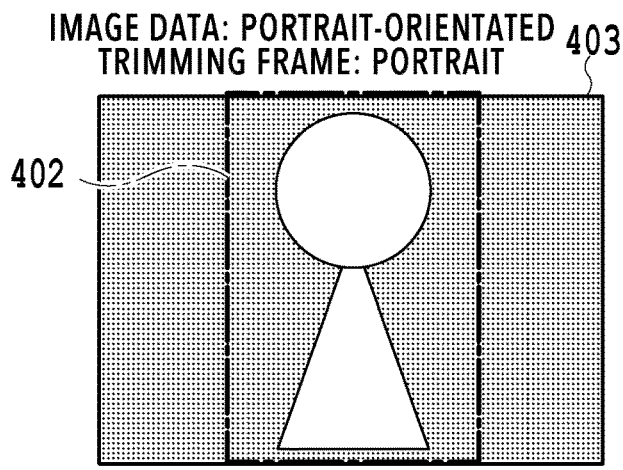
FIGS. 5A to 5C are views illustrating a trimming operation in the application.
Figure 5B:
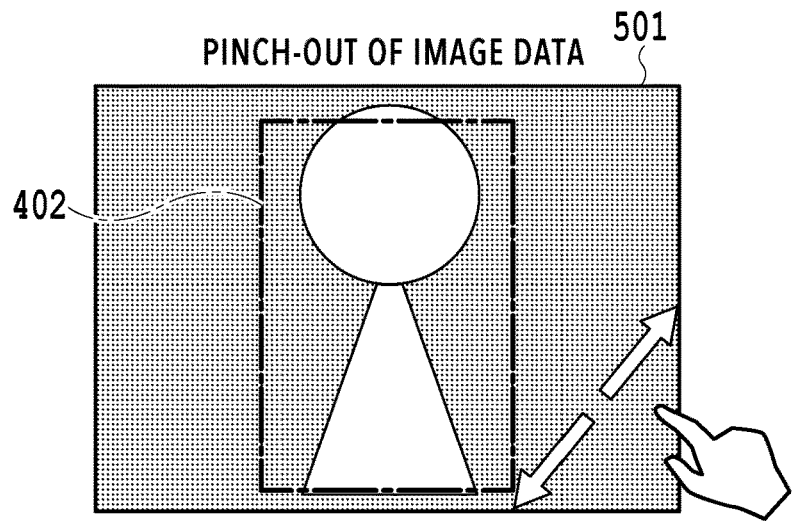
Figure 5C:
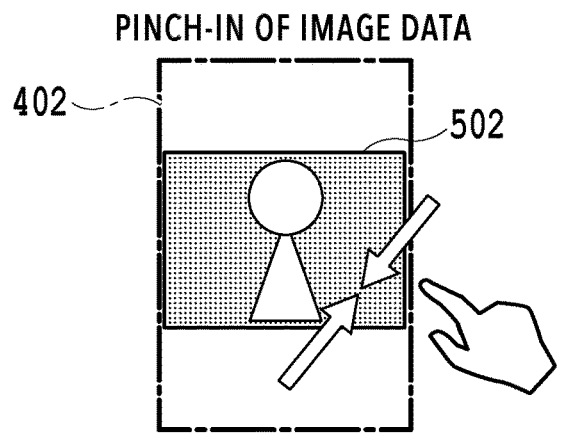

FIGS. 5A to 5C are views illustrating a trimming operation in the application operating on the information processing apparatus 100. FIG. 5A is a view extracting a portion of the image edit screen 400 illustrated in FIG. 4 where the image 403 and the print range frame 402 are both displayed. As described above, the image 403 is the landscape-oriented image and the orientation of the print range frame 402 is portrait. An image 501 in FIG. 5B illustrates an example in which the image 403 is enlarged by a touch operation (pinch out) performed by the user. In other words, the image 501 is an example in which the image 403 is enlarged without changing the size or position of the print range frame 402. An image 502 in FIG. 5C illustrates an example in which the image 403 is reduced by a touch operation (pinch in) performed by the user. Note that the image 403 (including scaled images) can be freely arranged on the print range frame 402 by performing a different touch operation (dragging) or the like. In other words, the position of the image can be changed without changing the size or position of the print range frame 402.

As described above, in the embodiment, the size and orientation of the print range frame 402 is determined to be, so to say, in a state suitable for the printing by the setting in the print screen 300 and the image edit screen 400. Accordingly, the user can freely edit the arrangement (enlarging, reducing, moving, and the like) of the image 403 in the print range frame 402. Note that, in the case where the user desires to change the size or orientation of the print range frame 402, the user only has to change the setting in the print screen 300 and the image edit screen 400 to desired setting.

Figure 6:
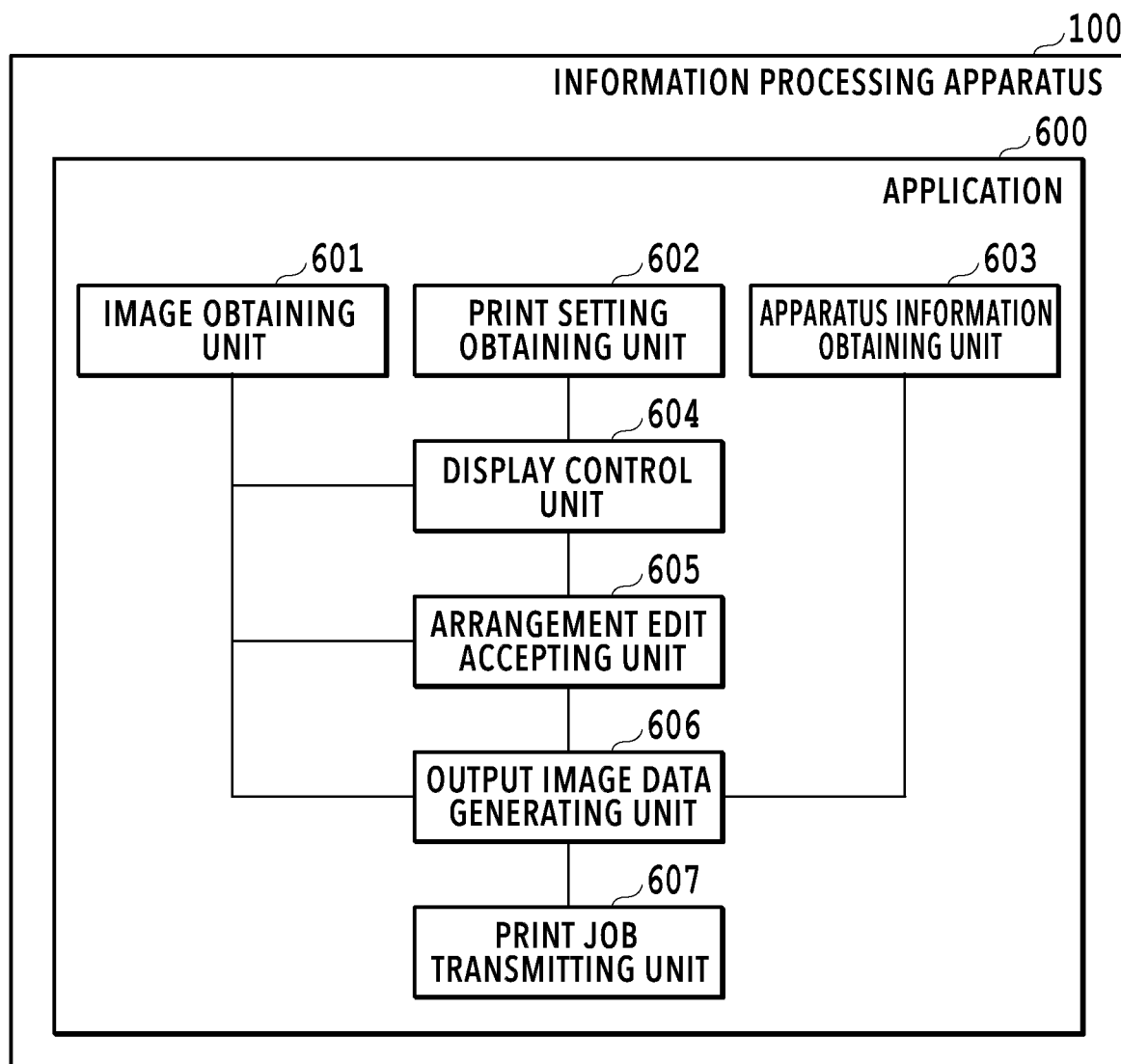
FIG. 6 is a diagram illustrating an example of a functional block diagram of the application.

FIG. 6 is a diagram illustrating an example of functional blocks in an application 600 installed in the information processing apparatus 100 of the embodiment. The application 600 includes an image obtaining unit 601, a print setting obtaining unit 602, an apparatus information obtaining unit 603, a display control unit 604, an arrangement edit accepting unit 605, an output image data generating unit 606, and a print job transmitting unit 607. The units illustrated in FIG. 6 function by causing the CPU 106 to load program codes stored in the storage unit 108 onto the memory 104 and execute them. Moreover, the information processing apparatus 100 operates as the image processing apparatus by activating the application 600. Note that the configuration of the application 600 relating to the embodiment is described herein merely as an example and the application 600 may have a different configuration. The configurations of the respective units in FIG. 6 are described together with the description of the flowchart of FIG. 7.

Figure 7:
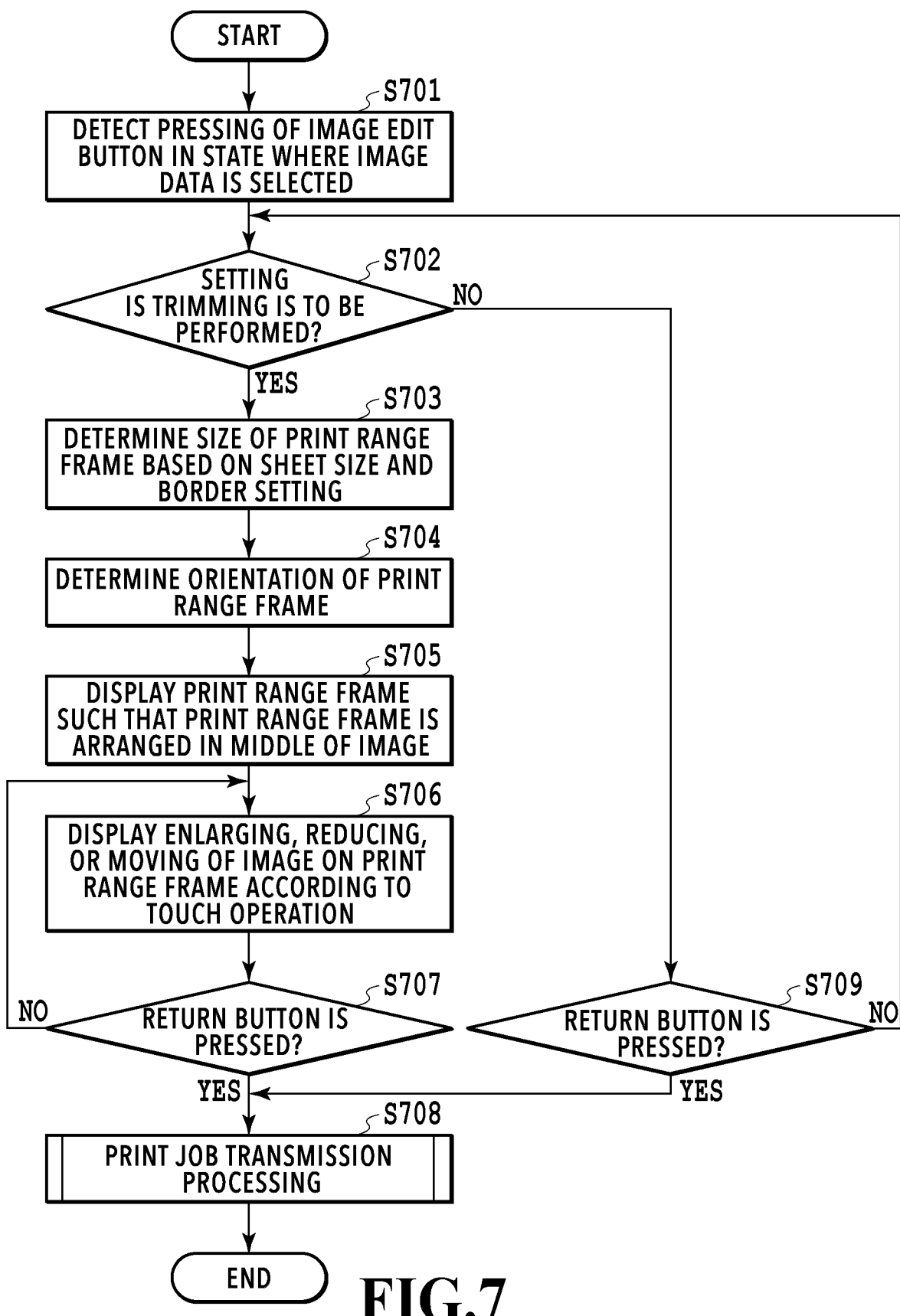
FIG. 7 is a flowchart relating to a trimming operation in the application.

FIG. 7 is a flowchart relating to a trimming operation in the application 600 operating on the information processing apparatus 100. A series of processes illustrated in the flowchart of FIG. 7 is performed by causing the CPU 106 to load program codes stored in the storage unit 108 onto the memory 104 and execute them. Alternatively, part or all of functions in steps of FIG. 7 may be implemented by hardware such as an ASIC or an electronic circuit. Note that the sign "S" in the description of each process means step in the flowchart (the same applies hereafter in the description).

The flowchart of FIG. 7 mainly illustrates the series of processes performed in the case where the user performs the print setting in the print screen 300 and performs the touch operation in the image edit screen 400 to freely arrange the scaled image in the print range frame 402. Moreover, it is assumed that, in the flowchart of FIG. 7, the processing starts from the state where the display control unit 604 is displaying the print screen 300 illustrated in FIG. 3. Note that the display control unit 604 displays print setting items to be displayed in the print setting item list 304, based on apparatus information obtained by the apparatus information obtaining unit 603. The apparatus information obtaining unit 603 obtains the apparatus information of the image forming apparatus 120 being a print target. The apparatus information includes information such as sheet sizes and sheet types usable in the image forming apparatus 120. Moreover, the apparatus information also includes information on whether the image forming apparatus 120 being the print target is the type of image forming apparatus that turns an image and prints it. The apparatus information obtaining unit 603 can obtain the aforementioned apparatus information by obtaining Capability (print capability) from the image forming apparatus 120 being the print target.

In S701, the application 600 detects pressing of the image edit button 302 in a state where selection of image data made by the user is accepted and the print setting is set up. In response to the pressing of the image edit button 302, the image obtaining unit 601 obtains the image data of the image selected by the user from the image list 301. The print setting obtaining unit 602 obtains the print setting set in the print setting item list 304. Predetermined values are set in the print setting item list 304 as defaults. The user can change the setting on the print screen 300 as necessary. In this example, the setting is assumed to be that illustrated in the print screen 300 of FIG. 3.

Next, in S702, the application 600 determines whether the check box 405 in the image edit screen 400 of FIG. 4 is checked or not, that is whether the setting is "trimming is to be performed" or not. In this example, the check box 405 is assumed to be checked such that the setting is "trimming is to be performed" in default. Items set in the trimming setting area in the image edit screen 400 of FIG. 4 are also included in the print setting. In the case where the setting is trimming is to be performed in S702, the processing proceeds to S703. In the case where the setting is not trimming is to be performed, the processing proceeds to S709. In S709, the application 600 determines whether the return button 401 in the image edit screen 400 is pressed. In the case where the return button 401 is pressed, the processing proceeds to S708. In the case where the return button 401 is not pressed, the processing returns to S702. Note that, although the processing relating to trimming is mainly described in this example, different image processing (for example, processing of adding predetermined image effects) may be performed in the middle of this flowchart.

Next, description is given of processing performed in the case where the setting is trimming is to be performed. In S703, the display control unit 604 determines the size of the print range frame 402 based on the print setting obtained by the print setting obtaining unit 602. The print setting obtaining unit 602 obtains the print setting made through the print screen 300. Specifically, the print setting obtaining unit 602 obtains the print setting in which the sheet size is L size and the border setting is set to bordered printing. The display control unit 604 determines the size of the print range frame 402 based on the sheet size and the border setting. Specifically, the display control unit 604 determines the size of the print range frame 402 such that the print range frame 402 has the aspect ratio of the print effective region of the L size excluding the border portions.

Next, in S704, the display control unit 604 determines the orientation of the print range frame 402 based on the setting of the "orientation of the trimming frame" in the image edit screen 400 of FIG. 4. In this example, since the setting is that illustrated in FIG. 4, the display control unit 604 determines that the orientation of the print range frame 402 is the portrait orientation.

In S705, the display control unit 604 displays the image 403 obtained by the image obtaining unit 601 on the image edit screen 400. Moreover, the display control unit 604 displays the print range frame 402 whose size and orientation are determined in S703 and S704 in a manner superimposed on the image 403. The display control unit 604 displays the print range frame 402 such that the print range frame 402 is arranged in the middle of the image 403.

In S706, the arrangement edit accepting unit 605 accepts an edit operation of the arrangement of the image 403. For example, as illustrated in FIGS. 5A to 5C, the arrangement edit accepting unit 605 enlarges, reduces, or moves the image 403 on the print range frame 402 according to a touch operation made by the user. The display control unit 604 displays the edit result of the arrangement of the image on the display unit 102.

In S707, the application 600 determines whether the return button 401 that is used to give an instruction to terminate the image edit and that is provided in the image edit screen 400 of FIG. 4 is pressed. The processing of S706 is performed while the return button 401 is not pressed. In the case where the return button 401 is pressed, the processing proceeds to S708.

In S708, the output image data generating unit 606 generates the output image data and the print job transmitting unit 607 transmits the output image data generated by the output image data generating unit 606 to the image forming apparatus 120 with the output image data included in the print job. Details of the print job transmission processing in S708 are described below by using FIGS. 8 and 9.

Figure 8A:
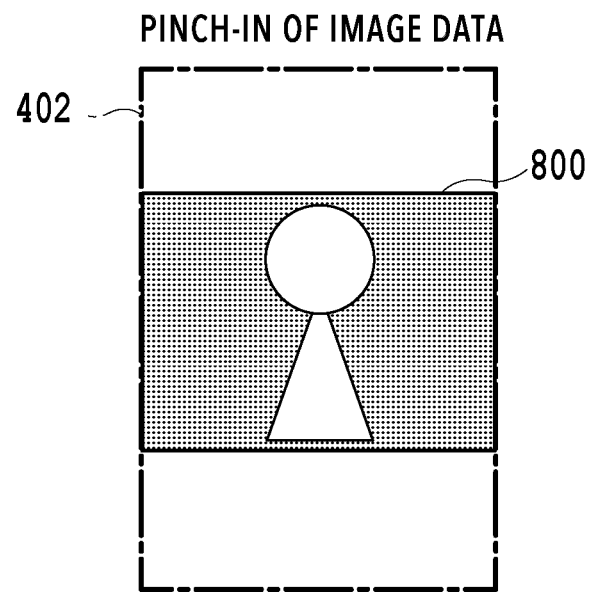
FIGS. 8A and 8B include views explaining an outline of print processing performed after the trimming operation.
Figure 8B:
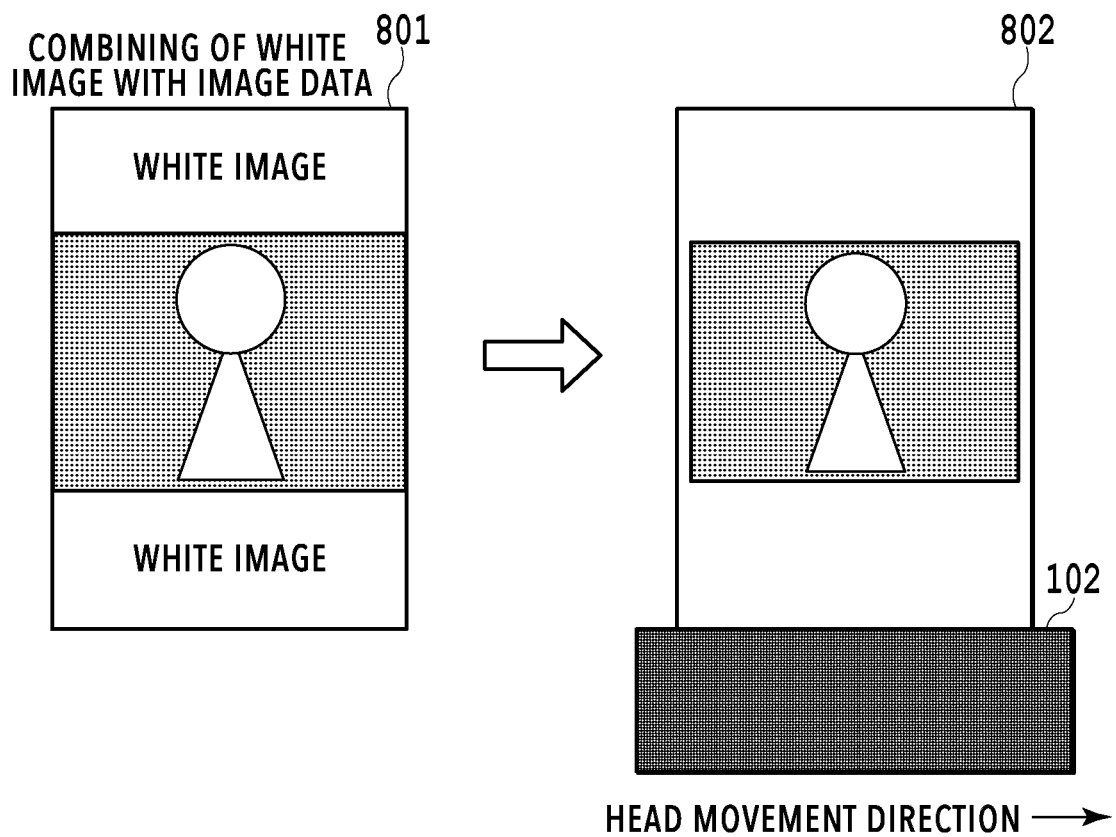

FIGS. 8A and 8B includes views explaining an outline of print processing performed after the trimming operation in the application 600. An image 800 illustrated in FIG. 8A is an image similar to the image 403 of FIG. 4 but is an image obtained by reducing the image 403 according to the display of the print range frame 402 by performing the touch operation (pinch in). Processing performed in the case where the application 600 detects pressing of the print button 305 made by the user in this state is described below. Specifically, processing of generating the output image data in the case where the arrangement of the image is edited as illustrated in FIG. 8A is described.

First, description is given of a comparative example to which the processing of the embodiment is not applied. The image 800 is an image obtained by reducing the image 403 and is also a landscape-oriented image. Accordingly, in the case where the image 800 is included in the print job as the output image data and is transmitted to the image forming apparatus 120, the image forming apparatus 120 turns the image 800 90 degrees and prints it as illustrated in FIG. 2B. The image forming apparatus 120 performs the processing of scaling the image as necessary. Accordingly, in the case where the image data of the image 800 obtained by reducing the image 403 is transmitted to the image forming apparatus 120 as the output image data together with the print setting information, the print result 211 as illustrated in FIG. 2B is outputted from the image forming apparatus 120. Such a result is a print result contrary to the intention of the user who has edited the arrangement of the image by using the print range frame 402 with an intention of, for example, writing characters in the margins by hand.

Accordingly, the application 600 of the embodiment combines a predetermined image in regions where no image 800 is arranged in the print range frame 402. In the embodiment, the predetermined image is an image for which no color materials are outputted in the image forming apparatus 120. Specifically, the predetermined image is a white image. An image 801 in FIG. 8B illustrates an image obtained by combining the white image with the image 800. The image 801 is an image with an aspect ratio adapted to the print range frame 402 and is a portrait-oriented image. As described above, the application 600 generates the output image data obtained by combining the white image with the scaled image 800.

The application 600 transmits the output image data of the portrait-oriented image 801 and the print setting information (sheet size (L size), border setting (bordered printing)) to the image forming apparatus 120. Then, since the sheet conveyance direction is the portrait direction and the output image data is portrait-oriented, the image forming apparatus 120 performs the print processing without turning the image 90 degrees. Specifically, as illustrated in FIG. 8B, the image data is scaled with the image 801 and the aspect ratio of the bordered print effective region of the L size maintained and is converted into print data of cyan/magenta/yellow/black/ and the like. As a result, a print result 802 is outputted. The print result 802 is a result similar to the state where the user has edited the arrangement of the image by using the print range frame 402. For example, since the print result 802 includes margin portions above and below the image, the user can write characters in the margins by hand. In other words, the print result intended by the user is achieved.

Figure 9:
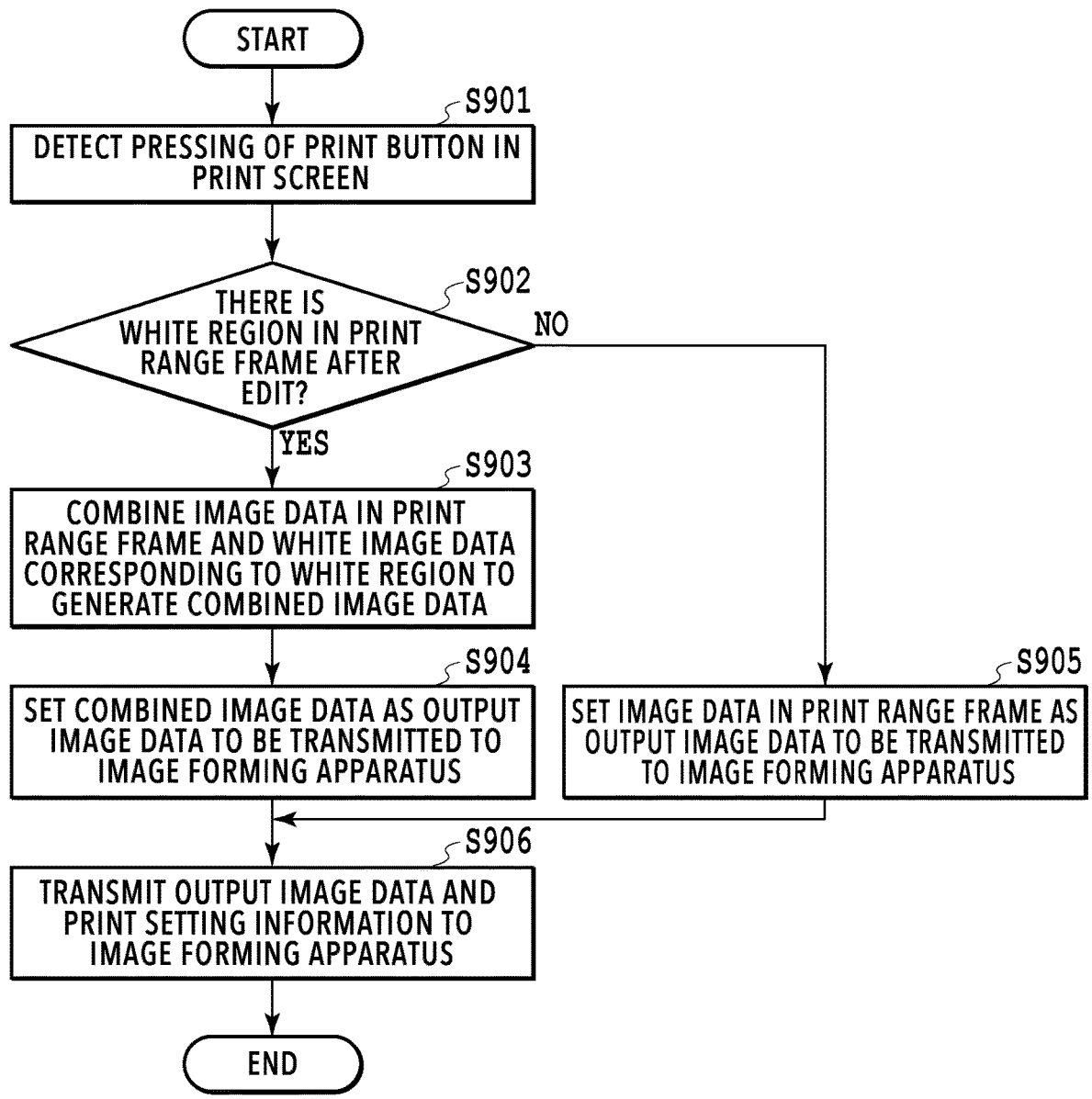
FIG. 9 is a flowchart illustrating the print data transmission processing in the application.

FIG. 9 is a flowchart illustrating the print job transmission processing after the trimming operation in the application 600 of the embodiment.

In S901, the application 600 detects pressing of the print button 305 in FIG. 3. Specifically, the application 600 accepts input of print instruction from the user. In S902, the application 600 determines whether there is a white region in the print range frame 402 after the image edit. In the case where there is a white region, the processing proceeds to S903. In the case where there is no white region, the processing proceeds to S905.

In S903, the output image data generating unit 606 combines the image data in the print range frame 402 and white image data corresponding to the white region to generate combined image data. Then, the processing proceeds to S904. In S904, the application 600 determines the combined image data generated in S903 as the output image data to be transmitted to the image forming apparatus 120. Then, the processing proceeds to S906.

Meanwhile, in the case where the application 600 determines that there is no white region in the print range frame 402, in S905, the output image data generating unit 606 determines the image data corresponding to the image in the print range frame 402 as the output image data to be transmitted to the image forming apparatus 120. Specifically, the output image data generating unit 606 generates the image data obtained by performing trimming to cut out the image in the print range frame 402 as the output image data. Then, the processing proceeds to S906.

In S906, the print job transmitting unit 607 transmits the print job including the output image data determined in S904 or S905 to the image forming apparatus 120. In other words, the print job transmitting unit 607 transmits the print job including the output image data and the print setting information to the image forming apparatus 120. Then the processing is terminated.

As described above, according to the embodiment, the print result intended by the user can be achieved also in the case where the image forming apparatus 120 is the image forming apparatus that turns an image and prints it. For example, in the case where the user performs processing of editing the arrangement of the image to provide margins and the like for handwriting in the information processing apparatus 100, the print result intended by this user can be achieved. Note that, although the example in which the user provides margins for handwriting is described, this technique may be applied to the case where margins are to be decorated with masking tapes with good designs, stamps used to create new year's cards, and the like.

Note that, in the case where the orientation of the trimming frame is set to landscape in the radio button 406 of FIG. 4, the print range frame 402 is displayed in the landscape orientation. In this case, in the case where the sheet size is L size, since the image outputted from the application 600 is a landscape-oriented image, the image forming apparatus 120 turns the image and performs the print processing. Also in this case, since the user checks the print range frame 402 and the image and recognizes that the landscape-oriented image is to be printed, the print result intended by the user is outputted even in the case where the image is turned in the image forming apparatus 120.

Embodiment 2

In Embodiment 1, description is given of the example in which the predetermined image is combined in the region where no image is arranged in the print range frame 402. Then, description is given of the example in which the white image determined in advance is combined as the predetermined image. In this embodiment, description is given of an example in which the user can select the predetermined image. Note that the configuration of the information processing apparatus 100 is the same as that in Embodiment 1 and description thereof is thus omitted.

Figure 10:
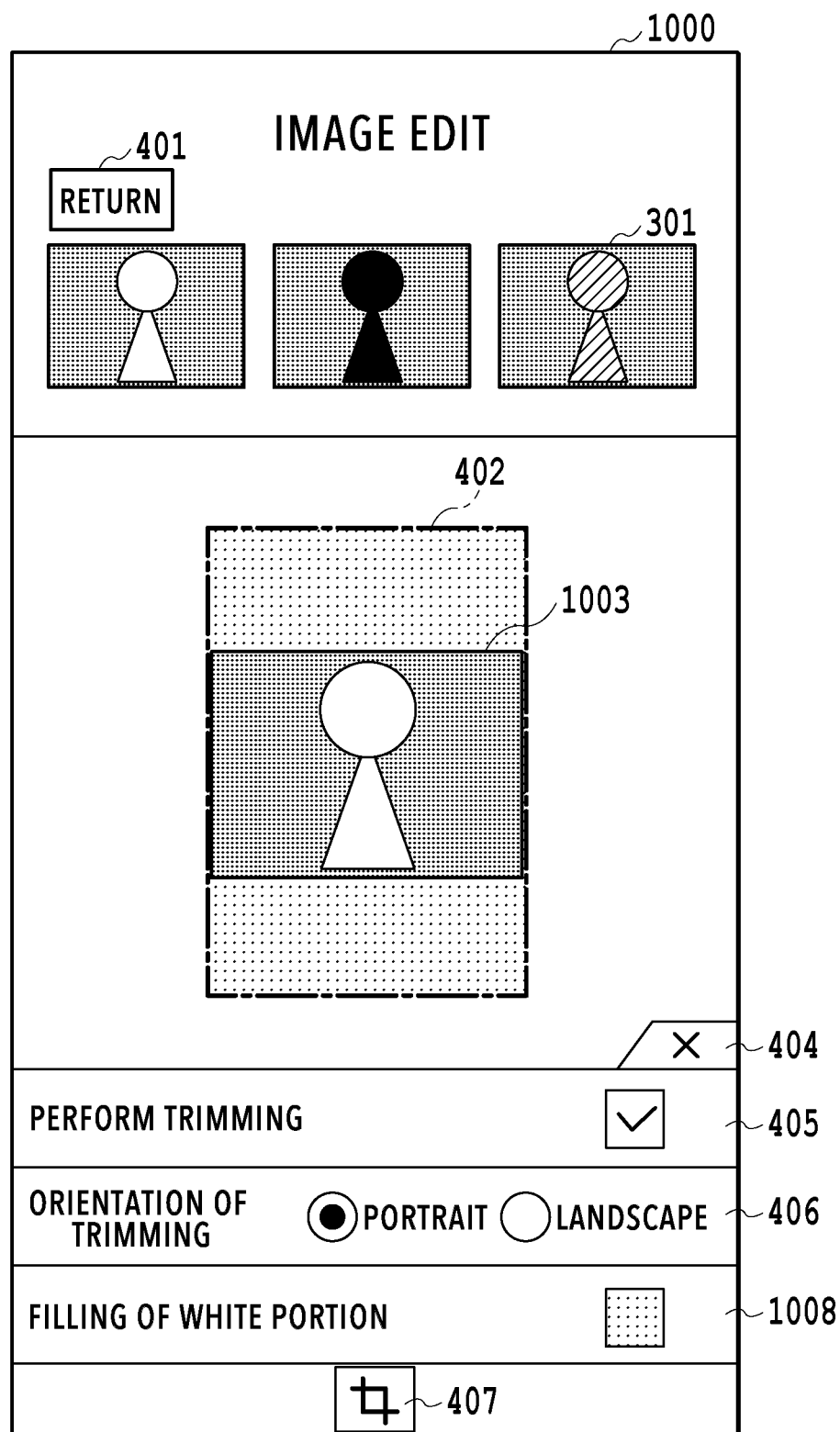
FIG. 10 is a view illustrating an image edit screen of the application.

FIG. 10 is a view illustrating an image edit screen 1000 of the application 600 in the embodiment. The image edit screen 1000 is basically the same screen as the image edit screen 400 described in FIG. 4. In the image edit screen 1000, white portion filling setting 1008 is added to the trimming setting area of the image edit screen 400 illustrated in FIG. 4. In FIG. 10, an image 1003 reduced by a user operation is displayed as an image to be edited. In the case where the filling setting 1008 is changed, a region in which no image 1003 is arranged in the print range frame 402 is replaced by a changed filling pattern. In the image edit screen 1000, a preview screen in which the replacement pattern is combined with the image 1003 is displayed. Note that the filling setting 1008 may include various colors or patterns and may also include a pattern of white image. The white portion filling setting 1008 may be configured to be selectable only in the case where a white portion appears due to editing of the arrangement by the user.

As described above, according to the embodiment, any pattern desired by the user can be combined in a white region in the print range frame 402. Moreover, this combined image is outputted as a print result intended by the user as described in Embodiment 1.

Embodiment 3

In Embodiment 1, description is given assuming that the image forming apparatus being the destination to which the print job is transmitted from the information processing apparatus 100 is the apparatus that turns an image depending on the sheet conveyance direction and the image and performs the print processing. The apparatus that turns the image depending on the sheet conveyance direction and performs the print processing as described in Embodiment 1 is hereafter referred to as the first image forming apparatus. In this embodiment, description is given of the application 600 (information processing apparatus 100) that can perform processing for a second image forming apparatus configured to perform a type of processing different from that of the first image forming apparatus.

The second image forming apparatus is assumed to be, for example, an apparatus capable of performing printing by using sheets with large sizes such as AO sheets and BO sheets like a large-format printer. This type of apparatus sometimes cannot receive image data with large size due to a memory or the like in the apparatus. Accordingly, for the second image forming apparatus, the application 600 turns the image as necessary depending on the sheet conveyance direction in the second image forming apparatus and the image to be transmitted to the second image forming apparatus. Then, the application 600 generates print data to be used for the print processing in the second image forming apparatus based on the image data obtained as a result of turning and transmits the print data to the second image forming apparatus. The second image forming apparatus performs print processing based on print data transmitted from the application 600 (information processing apparatus 100).

The application 600 in the information processing apparatus 100 of the embodiment basically has the same configuration as that of the application 600 described in Embodiment 1. Specifically, the application 600 displays the print range frame determined based on the sheet size and the border setting according to the print setting and the user edits the arrangement of the image. This embodiment is different from Embodiment 1 in that the application 600 performs processing of determining whether the destination image forming apparatus is the first image forming apparatus or the second image forming apparatus. Then, in the case where the destination is the second image forming apparatus that has no function of turning an image and printing it, the application 600 executes the turning processing and performs processing of generating the print data for the second image forming apparatus by using the image data after the turning.

Figure 11:
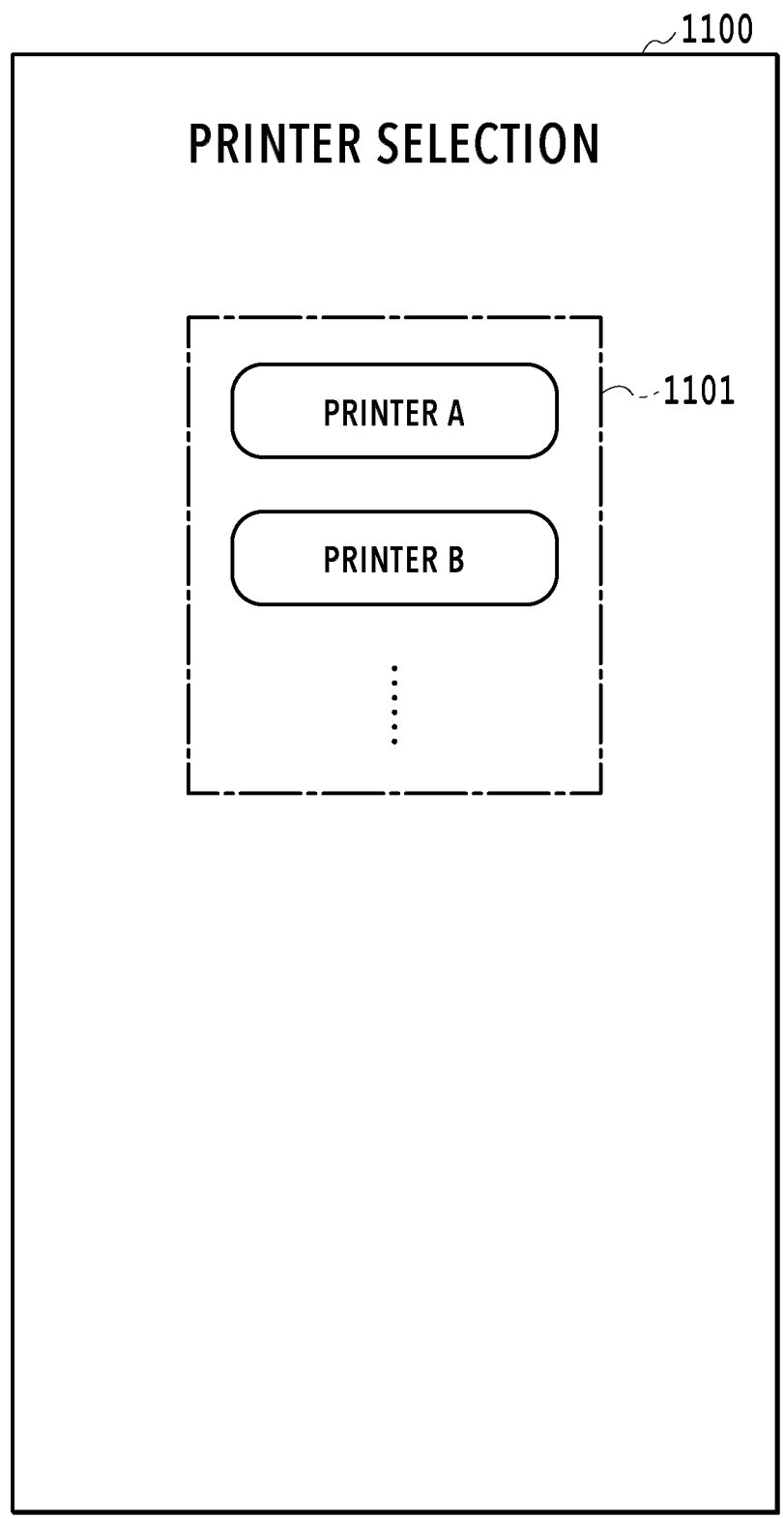
FIG. 11 is a view illustrating an example of a printer selecting screen in the application.

FIG. 11 is a view illustrating an example of a printer selecting screen 1100 in the application 600. A list 1101 of printers (image forming apparatuses) usable by the application 600 is displayed in the printer selecting screen 1100. In the case where the user selects a desired printer from the list 1101, the application 600 determines the selected printer as the destination image forming apparatus. In this case, the apparatus information obtaining unit 603 obtains the type of the selected printer indicating whether the printer has the function of turning an image and printing it, as the apparatus information. Specifically, the apparatus information obtaining unit 603 obtains the information on Capability (printing capability) of the destination image forming apparatus as described in Embodiment 1. The application 600 can determine whether the destination image forming apparatus has the function of turning an image and printing it, based on the apparatus information obtained by the apparatus information obtaining unit 603.

FIG. 12 is a flowchart illustrating the print job transmission processing after the trimming operation in the application 600 of the embodiment. Note that the same processes as the processes illustrated in FIG. 9 are denoted by the same reference signs. First, as in the processing of FIG. 9, in S901, the application 600 detects the pressing of the print button 305 in FIG. 3. Thereafter, the processing proceeds to S1212 and the application 600 determines whether the destination image forming apparatus is the type having the function of turning an image and printing it, in other words, the type supporting the 90 degrees turning. This determination is performed based on the apparatus information obtained by the apparatus information obtaining unit 603 as described above. In the case where the destination image forming apparatus has the function of turning an image and printing it, the processing proceeds to S902. If not, the processing proceeds to S1213. The processes of S902 to S906 are the same as those described in Embodiment 1 and description thereof is thus omitted.

In S1213, the output image data generating unit 606 generates the image data for the second image forming apparatus that is the destination image forming apparatus, by using image data corresponding to the image in the print range frame. In S1213, processes substantially the same as S902 to S905 are performed. Specifically, in the case where there is a white region in the print range frame, the output image data generating unit 606 generates combined image data in which corresponding white image data is combined in the white region, as the output image data. In the case where there is no white region in the print range frame, the output image data generating unit 606 determines image data corresponding to the image in the print range frame, as the output image data. Moreover, in this step, the output image data generating unit 606 determines whether to turn the image, based on the output image data and the sheet conveyance direction of the second image forming apparatus. In the case where the image is to be turned, the output image data generating unit 606 performs processing of turning the output image data. Then, the output image data generating unit 606 generates print data in a format interpretable by the second image forming apparatus, by using the output image data.

In S1214, the print job transmitting unit 607 transmits the print job including the print setting information and the print data generated in S1213 to the second image forming apparatus. Specifically, the print job transmitting unit 607 transmits the print data instead of the output image data as the print job to the second image forming apparatus.

As described above, in the embodiment, the application 600 determines whether the image forming apparatus being the destination apparatus of the print job has the function of turning an image and printing it. In the case where the image forming apparatus has this function, the application 600 performs the same processing as that in Embodiment 1. Meanwhile, in the case where the destination image forming apparatus does not have the function of turning the image and printing it, the application 600 performs the processing of turning the image as necessary and generates the print data for the image forming apparatus by using the turned image. Accordingly, use of the application 600 of the embodiment enables output of the print result intended by the user irrespective of the type of the destination image forming apparatus.

Note that, although the example of combining the white image is described in this embodiment, the application 600 may determine the pattern to be combined by receiving selection from the user as described in Embodiment 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-137852, filed Jul. 26, 2019, which is hereby incorporated by reference herein in its entirety.

What is claimed is:

1. A method comprising the steps of:
    displaying, by an information processing apparatus, a predetermined frame;
    performing, by the information processing apparatus, an edit using the predetermined frame to determine a range of an image to be printed;
    in a case where the edit using the predetermined frame is finished in a state the predetermined frame including a portion in which the image is not arranged, performing predetermined control to print a region of the image included in the predetermined frame on a printing medium such that a direction of short sides of the region corresponds to a direction of long sides of the printing medium and a direction of long sides of the region corresponds to a direction of short sides of the printing medium;
    not performing the predetermined control in a case where the edit using the predetermined frame is finished in a state the predetermined frame not including a portion in which the image is not arranged; and
    transmitting, to an image forming apparatus, a print job including JPEG data to cause the image forming apparatus to print the region of the image included in the predetermined frame.

2. The method according to claim 1, wherein an aspect ratio of the predetermined frame is an aspect ratio depending on a type of the printing medium.

3. The method according to claim 1, wherein an aspect ratio of the predetermined frame is an aspect ratio depending on print setting for printing the region.

4. The method according to claim 3, wherein the print setting includes border setting indicating whether the region is printed by bordered printing or borderless printing.

5. The method according to claim 1, wherein by a print job to print the region on the printing medium, a region of the image included in the predetermined frame is printed on the printing medium and a region of the image not included in the predetermined frame is not printed on the printing medium.

6. The method according to claim 1, wherein the edit using the predetermined frame is trimming of the image.

7. The method according to claim 1, further comprising displaying a predetermined button,
    wherein the edit using the predetermined frame is finished based on pressing of the predetermined button.

8. The method according to claim 1, wherein the predetermined control includes combining processing of adding a predetermined image to a region of the image included in the predetermined frame.

9. The method according to claim 8, wherein in a case where a region of the image included in the predetermined frame has a landscape-oriented shape, the predetermined image is added above and below the region of the image included in the predetermined frame.

10. The method according to claim 8, wherein the predetermined image is a white image.

11. The method according to claim 8, wherein data generated by the combining processing is included in the print job transmitted to the image forming apparatus.

12. The method according to claim 1, wherein the predetermined control is not performed in a case where the edit using the predetermined frame is not performed.

13. The method according to claim 1, wherein in a case where the predetermined control is performed, the region of the image included in the predetermined frame is printed on the printing medium based on the print job such that the direction of the short sides of the region corresponds to the direction of the long sides of the printing medium and the direction of the long sides of the region corresponds to the direction of the short sides of the printing medium.

14. The method according to claim 1, wherein in a case where the edit using the predetermined frame is finished in a state the predetermined frame not including a portion in which the image is not arranged, the region is printed on the printing medium based on the print job such that the direction of the short sides of the region corresponds to the direction of the short sides of the printing medium and the direction of the long sides of the region corresponds to the direction of the long sides of the printing medium.

15. The method according to claim 1, wherein the predetermined control is control for printing the region of the image included in the predetermined frame on the printing medium such that the direction of the short sides of the region is substantially identical to the direction of the long sides of the printing medium and the direction of the long sides of the region is substantially identical to the direction of the short sides of the printing medium.

16. The method according to claim 1, wherein the edit using the predetermined frame is performed and the print job is transmitted by a predetermined application program comprised in the information processing apparatus.

17. The method according to claim 1, wherein the image forming apparatus performs control based on an aspect ratio of an image based on the JPEG data included in the print job to perform printing based on the print job such that a direction of long sides of the image based on the JPEG data included in the print job corresponds to the direction of the long sides of the printing medium and a direction of short sides of the image based on the JPEG data included in the print job corresponds to the direction of the short sides of the printing medium.

18. The method according to claim 1, wherein in a case where the printing medium has an A4 size, the direction of the long sides of the printing medium corresponds to a conveyance direction of the printing medium in the image forming apparatus.

19. A method comprising the steps of:
- displaying, by an information processing apparatus, a predetermined frame;
- performing, by a predetermined application program of the information processing apparatus, an edit using the predetermined frame to determine a range of an image to be printed;
- in a case where the edit using the predetermined frame is finished in a state the predetermined frame including a portion in which the image is not arranged, performing predetermined control to print a region of the image included in the predetermined frame on a printing medium such that a direction of short sides of the region corresponds to a direction of long sides of the printing medium and a direction of long sides of the region corresponds to a direction of short sides of the printing medium;
- not performing the predetermined control in a case where the edit using the predetermined frame is finished in a state that the predetermined frame not including a portion in which the image is not arranged; and
- transmitting, by the predetermined application program, a print job to an image forming apparatus to cause the image forming apparatus to print the region of the image included in the predetermined frame.

20. A method comprising the steps of:
- displaying, by an information processing apparatus, a predetermined frame;
- performing, by the information processing apparatus, an edit using the predetermined frame to determine a range of an image to be printed;
- in a case where the edit using the predetermined frame is finished in a state the predetermined frame including a portion in which the image is not arranged, performing predetermined control to print a region of the image included in the predetermined frame on a printing medium such that a direction of short sides of the region corresponds to a direction of long sides of the printing medium and a direction of long sides of the region corresponds to a direction of short sides of the printing medium;
- not performing the predetermined control in a case where the edit using the predetermined frame is finished in a state the predetermined frame not including a portion in which the image is not arranged; and
- transmitting, to an image forming apparatus, a print job including predetermined format data to cause the image forming apparatus to print the region of the image included in the predetermined frame,
- wherein the image forming apparatus performs control based on an aspect ratio of an image based on the predetermined format data included in the print job to perform printing based on the print job such that a direction of long sides of the image based on the predetermined format data included in the print job corresponds to the direction of the long sides of the printing medium and a direction of short sides of the image based on the predetermined format data included in the print job corresponds to the direction of the short sides of the printing medium.

* * * * *